(12) United States Patent
Corsi

(10) Patent No.: US 8,733,718 B2
(45) Date of Patent: May 27, 2014

(54) NON-INVASIVE ROOF MOUNTING ADAPTOR AND METHOD FOR INSTALLING SAME

(71) Applicant: Peter A. Corsi, Clifton Park, NY (US)

(72) Inventor: Peter A. Corsi, Clifton Park, NY (US)

( * ) Notice: Subject to any disclaimer, the term of this patent is extended or adjusted under 35 U.S.C. 154(b) by 0 days.

(21) Appl. No.: 13/785,642

(22) Filed: Mar. 5, 2013

(65) Prior Publication Data
US 2013/0298494 A1    Nov. 14, 2013

Related U.S. Application Data

(60) Provisional application No. 61/645,230, filed on May 10, 2012.

(51) Int. Cl.
 *E04D 1/34*    (2006.01)
(52) U.S. Cl.
 USPC ............ 248/205.1; 52/173.1; 52/27; 52/90.2; 52/704; 52/745.21
(58) Field of Classification Search
 USPC .......... 248/45, 49, 205.1; 52/27, 58, 60, 90.2, 52/173.1, 173.3, 704, 705, 708
 See application file for complete search history.

(56) References Cited

U.S. PATENT DOCUMENTS

| | | | |
|---|---|---|---|
| 2,002,006 A * | 5/1935 | Hall | 244/235 |
| 2,628,796 A * | 2/1953 | Krizman | 248/515 |
| 4,223,667 A | 9/1980 | Paymal | |
| 4,581,863 A | 4/1986 | Thaler | |
| 4,617,771 A * | 10/1986 | Tomaszewski | 52/410 |
| 4,651,489 A * | 3/1987 | Hodges et al. | 52/409 |
| 4,989,826 A | 2/1991 | Johnston, Jr. | |
| 5,217,191 A | 6/1993 | Smith | |
| 5,328,212 A | 7/1994 | Kosik, Jr. et al. | |
| 5,603,187 A | 2/1997 | Merrin et al. | |
| 5,816,554 A | 10/1998 | McCracken | |
| 5,820,092 A | 10/1998 | Thaler | |
| 6,324,800 B1 | 12/2001 | Valentz et al. | |
| 6,360,491 B1 | 3/2002 | Ullman | |
| 6,526,701 B2 * | 3/2003 | Stearns et al. | 52/24 |
| 6,592,093 B2 | 7/2003 | Valentz | |

(Continued)

FOREIGN PATENT DOCUMENTS

| | | |
|---|---|---|
| DE | 10 2010 016677 A1 | 11/2011 |
| JP | 2005 002772 B2 | 1/2005 |

OTHER PUBLICATIONS

International Search Report in EP 1316710.3 mailed by the EPO on Sep. 18, 2013 ((9 pages).

*Primary Examiner* — Jeanette Chapman
(74) *Attorney, Agent, or Firm* — Abelman, Frayne & Schwab

(57) ABSTRACT

A mounting adapter for attaching an object to a flat surface includes an anchor plate having a plurality of first apertures extending therethrough. Each first aperture is configured to receive a first elongated fastener having a length sufficient to fasten to a support structure located beneath the surface for attaching the anchor plate thereto. A plurality of threaded apertures is formed in the anchor plate. A cover plate is positioned over the anchor plate and has a plurality of third apertures that align with the plurality of threaded apertures in the anchor plate. A threaded fastener extends through each third aperture and is threadedly engaged with the second threaded apertures of the anchor plate for securely attaching the cover plate to the anchor plate. One or more fourth apertures are formed in the cover plate and configured to receive a third fastener for attaching the object to the mounting adapter.

23 Claims, 11 Drawing Sheets

(56) References Cited

U.S. PATENT DOCUMENTS

| | | | |
|---|---|---|---|
| 6,663,070 B2 | 12/2003 | Valentz et al. | |
| 6,669,163 B2 | 12/2003 | Davis, Jr. | |
| 6,863,253 B2 | 3/2005 | Valentz et al. | |
| 7,168,138 B2 * | 1/2007 | Lubera et al. | 24/295 |
| 7,213,304 B2 * | 5/2007 | Lubera et al. | 24/295 |
| 7,475,513 B2 | 1/2009 | Parker | |
| 7,661,240 B2 | 2/2010 | Sargent | |
| 7,686,268 B2 | 3/2010 | Terunuma et al. | |
| 7,730,901 B2 * | 6/2010 | Ball | 137/15.17 |
| 7,762,027 B1 | 7/2010 | Wentworth et al. | |
| 7,895,808 B1 | 3/2011 | Wentworth et al. | |
| 7,905,064 B1 | 3/2011 | Wentworth et al. | |
| 7,921,607 B2 | 4/2011 | Thompson et al. | |
| 8,122,648 B1 * | 2/2012 | Liu | 52/58 |
| 8,448,405 B2 * | 5/2013 | Schaefer et al. | 52/710 |
| 2004/0031902 A1 | 2/2004 | Davis, Jr. | |
| 2011/0247279 A1 | 10/2011 | Stearns et al. | |
| 2011/0247295 A1 | 10/2011 | Stearns et al. | |
| 2012/0023835 A1 | 2/2012 | Stearns et al. | |
| 2012/0023836 A1 | 2/2012 | Stearns et al. | |
| 2012/0023843 A1 | 2/2012 | Stearns et al. | |
| 2012/0031019 A1 | 2/2012 | Stearns et al. | |
| 2012/0144760 A1 * | 6/2012 | Schaefer et al. | 52/58 |
| 2013/0074441 A1 * | 3/2013 | Stearns | 52/705 |

* cited by examiner

NON-INVASIVE ROOF MOUNTING ADAPTOR AND METHOD FOR INSTALLING SAME

CROSS-REFERENCE TO RELATED APPLICATION

This patent application claims the benefit of U.S. Provisional Application No. 61/645,230, filed May 10, 2012, the content of which is incorporated by reference herein in its entirety.

FIELD OF THE INVENTION

The present invention relates to support apparatus, and more specifically to mounting adapters for supporting equipment and hardware devices typically found on a roof top of a building or in direct contact with the ground, and installing the same.

BACKGROUND OF THE INVENTION

Commercial and residential buildings often have flat top roofs and/or slightly sloped roof tops, as opposed to high-pitched roofs that are typically observed on many types of residential houses (e.g., colonial, cape, ranch, Tudor and other styles of houses). The flat top roofs on such buildings or other edifices avail themselves for installing various types of equipment that are used by the owners and/or tenants of the buildings. Such "equipment" can include air conditioning units, heat exchangers, water towers, protective railings, piping, photovoltaic (solar) panels, communications antennae, among other equipment and hardware devices typically installed on roof surfaces, and especially flat top roofs.

Securing the equipment is typically implemented by providing a frame or chassis to support the equipment on the roof. The frame or chassis is preferably provided by the equipment manufacturer or can be custom configured in accordance to local building codes and standards to support the equipment. Anchor devices are then used as interfaces for securing the frame or chassis to the decking of the roof. For example, a frame or chassis having four support legs would first require four anchor devices to be installed at a selected location on the flat top roof corresponding to each support leg. Thereafter, the frame/chassis is positioned over the four anchor devices to enable the installer to properly attach the four support legs to a corresponding anchor device.

Referring to the FIG. 1, a perspective view of a prior art anchor device 100 is illustratively shown being installed on a roof deck 110. Installing the anchor devices that are presently available in the commercial market requires the equipment technician and/or roofer to penetrate the roof surface including, for example, the roof covering 112 or membrane and insulation 116 therebelow, and attach the anchor device 100 directly to a roof structural member 114, such as a rafter or structural decking. More specifically, when retrofitting anchor devices into an existing membrane or covering 112 on a roof 110, a significant hurdle is that the anchoring devices 100 must be secured directly to the structural decking 114 or structural members below the roof covering 112 to provide ample support for the equipment. This is especially true for anchor devices 100 which need to withstand lateral loads. Mounting these types of anchor devices 100 typically requires cutting through the roof membrane 112 and creating an opening 118 in the insulation 116 to expose the building's structural deck 114 or other structural components hidden beneath the roof.

This type of invasive operation compromises the integrity of the roof covering and necessitates some type of roof repair or patching work, which often creates "difficult to flash" penetrations. Additionally, flashing of the prior art anchor devices 100 frequently cannot be accomplished with roof manufacturer's approved procedures. Therefore, there is a need for a non-invasive roof mounting adaptor that does not require removal of the roof surface layers and insulation to expose the underlying roof decking and/or support structures.

SUMMARY OF THE INVENTION

In accordance with the embodiments of the invention described herein, the deficiencies of the prior art are overcome by a non-invasive, self sealing, structural roof mount adapter as illustratively shown and described herein. The roof mount adapter of the present invention can be mounted to any generally flat surface portion of a roof. Furthermore, the roof mount adapter is highly suitable for being topically applied to a low slope or flat, insulated, membrane roof cover system, and without the need for "invasive" cutting through the roof membrane and/or insulation to access the deck or structural components that are normally hidden below the roof covering. A roof mount adapter of the present invention can be utilized at specific locations along the roof wherever necessary to retain and provide adequate support for the equipment being installed on the roof. For example, a solar panel or air conditioning unit having a frame with four support legs can be secured to the roof surface by using four corresponding roof mount adapters of the present invention as illustratively shown and described herein.

Each roof mount adapter includes a "captive fastener head" feature which enables the use of standard, commercially available roof fasteners to structurally connect the roof mount adapter through the full thickness of a roof cover system to a variety of common roof decks or structural building components. The solid connection from roof mount adapter's position above the roof, through the "soft" non-structural, roof and insulation system to the solid support structure below has the ability to manage load forces in one or more directions and/or orientations, including forces in the lateral (shearing), downward (compression), and/or upward (tension) directions, and without damaging the roof and/or compressing the insulation.

The roof mount adapters' unique design, along with the well-known roofing fasteners and gaskets self-seal to nearly all common roof membrane systems, and without the need for patching the roof, or applying roof flashings or special roof membrane flashings kits to maintain weather proofing as seen with the prior art adapter devices. By utilizing standard, commercially available roof fasteners, the roof mount adapter of the present invention can accommodate roof and insulation thickness variances, for example, in a range of one-quarter (¼") inch to fifteen (15") inches thick, although such thickness are not limiting. Once installed, the roof mount adapter of the present invention can be used as a structural mounting point for a multitude of roof top equipment mounting needs.

In one embodiment, the present invention is a mounting adapter for attaching an object to a generally flat surface. The mounting adapter comprises a generally planar anchor plate having an upper surface and a lower surface, and a plurality of first apertures extending therethrough the upper and lower surfaces. Each first aperture is configured to receive a first elongated fastener having a length sufficient to extend therethrough the anchor plate and securely fasten to a support structure positioned beneath the generally flat surface. Further, each of a plurality of second apertures extends at least through the upper surface of the anchor plate. Alternatively, each of the plurality of second apertures extends therethrough the upper and lower surfaces of the anchor plate. A generally planar cover plate having an upper surface and a lower surface, which is positioned over the upper surface of the anchor plate. The cover plate includes a plurality of third apertures extending therethrough the upper and lower surfaces of the cover plate. The plurality of third apertures corresponds to and is positioned in alignment with the plurality of second apertures of the anchor plate. That is, each third aperture is aligned with a corresponding one of the plurality of second apertures. A second fastener extends through each of the third apertures and is securely engaged with a corresponding one of the plurality of second apertures of the anchor plate for securely mounting the cover plate over the anchor plate. The cover plate further includes one or more fourth apertures formed in at least the upper surface of the cover plate. Each fourth aperture is configured to receive a corresponding third fastener for securing the object to the mounting adapter (200).

In one aspect, the mounting adapter further includes a ring cover having an outer portion circumscribing the anchor plate and an inner portion positioned between the lower surface of the cover plate and the upper surface of the anchor plate. A ring gasket can be positioned between an upper surface of the inner portion of the ring cover and the lower surface of the cover plate.

In yet another aspect, the mounting adapter includes a gap formed between the lower surface of the cover plate and the upper surface of the anchor plate. The gap is formed by a head portion of each first elongated fastener extending upwardly from the upper surface of the anchor plate. In this manner, the lower surface of the cover plate provides a resultant force vector on the head and along the longitudinal axis of each first elongated fastener. That is, the load from the object is preferably transferred though the head and shank of each first elongated fastener to an underlying roofing deck or structure, thereby minimizing damage and/or crushing of the roof membrane and/or roof insulation underneath the present roof mount adapter.

In one aspect, each first aperture includes a counter-bore for receiving a head portion of a corresponding one of the plurality of first elongated fasteners. In still another aspect, the second apertures of the anchor plate and the corresponding aligned third apertures of the cover plate are spaced equidistantly apart from each other. In yet another aspect, each of the plurality of second apertures is a threaded aperture and each second fastener is a correspondingly dimensioned threaded bolt.

In another aspect, the cover plate and the anchor plate include a keying arrangement for aligning the cover plate over the anchor plate.

In yet another aspect, one or more fourth apertures extend through at least a portion of the upper surface of the cover plate, and each fourth aperture is configured to receive a corresponding one of the third fasteners. In still another aspect, the one or more fourth apertures extend through the upper and lower surfaces of the cover plate, and each fourth aperture is configured to receive a corresponding one of the third fasteners extending upright from the upper surface of the cover plate. Preferably, the one or more fourth apertures are threaded apertures and each third fastener is a bolt.

In still another aspect, the anchor plate can include one or more fifth apertures extending through at least a portion of the upper surface of the anchor plate. Each fifth aperture is aligned with a corresponding one of the fourth apertures (234) and configured to receive a head portion of the third fastener for attaching the object to the mounting adapter.

In another embodiment of the present invention, a mounting adapter for attaching an object to a mounting surface comprises a generally planar anchor plate having opposing planar surfaces and a plurality of first apertures extending therethrough the opposing surfaces, and a plurality of threaded apertures extending therethrough the opposing surfaces of the anchor plate. The plurality of first apertures are configured and dimensioned to receive a first elongated fastener having a length sufficient to extend and securely fasten to a support structure located beneath the mounting surface to attach the anchor plate to the mounting surface. A generally planar cover plate having opposing planar surfaces is configured for mounting over the anchor plate. The cover plate includes a plurality of third apertures which are configured and arranged to align with the plurality of threaded apertures of the anchor plate. A threaded fastener extends through each of the plurality of third apertures and threadedly engages with each respective threaded aperture of the anchor plate to securely attach the cover plate to the anchor plate such that a gap is formed therebetween the generally planar anchor and cover plates. One or more third fasteners are configured to interface with the one or more fourth apertures of the cover plate for attaching the object to the mounting adapter.

In still another embodiment, a method is provided for attaching an object to a mounting surface with a mounting adapter which comprises an anchor plate having a plurality of first apertures and a plurality of second apertures; a cover plate having a plurality of third apertures extending therethrough, each third aperture configured to align with a corresponding second aperture of the anchor plate, and at least one fourth aperture configured to receive a corresponding third fastener; and wherein the method comprises the steps of positioning the anchor plate on the mounting surface at a predetermined location; inserting an elongated fastener through a corresponding one of the first apertures; securing each elongated fastener to a predetermined support structure positioned beneath the mounting surface for attaching the anchor plate to the mounting surface; mounting the cover plate over the anchor plate such that each of the plurality of third apertures is positioned and axially aligned with each of the corresponding plurality of second apertures of the anchor plate; inserting a second fastener through a corresponding one of the third apertures; securing each second fastener to a corresponding second aperture in the anchor plate for firmly attaching the cover plate to the anchor plate; and securing at least one third fastener to a corresponding one of the at least one fourth aperture for attaching the object to the mounting adapter.

In one aspect, the method further comprises the steps of installing a base gasket on the mounting surface at the predetermined location prior to positioning the anchor plate thereon; and positioning a lower surface of the anchor plate on the base gasket.

In another aspect, the method further comprises the step of mounting a ring cover over the anchor plate prior to mounting the cover plate. In one aspect and prior to mounting the ring cover, an adhesive is applied to an area of the mounting surface which circumscribes the anchor plate. In still another aspect, the method further comprises the step of mounting a gasket seal over the cover ring prior to mounting the cover plate.

In a further aspect, the method comprises the step of tightening the second fastener in each third aperture to compress the gasket seal positioned between the cover plate and the cover ring, and compress the adhesive positioned between the cover ring and the mounting surface.

BRIEF DESCRIPTION OF THE DRAWINGS

The invention will be further described below and with reference to the attached drawings in which.

Figure 1:
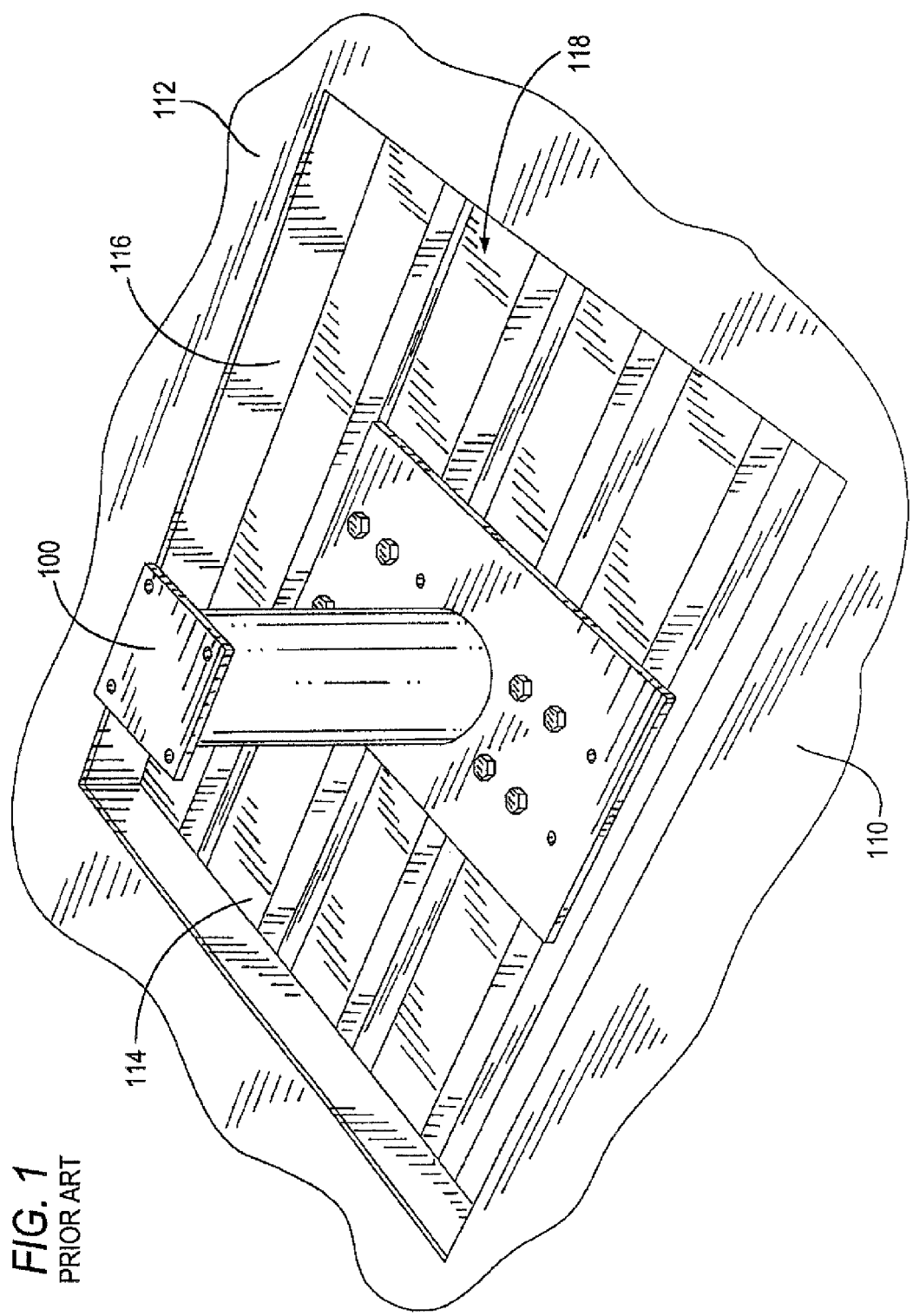
FIG. 1 is a top perspective view of a prior art roof mounting adapter being installed on a roof of a structure by removing portions of the roof membrane and underlying insulation to expose the roof decking therebelow.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE PREFERRED EMBODIMENT

Referring now to FIGS. 2-8, there is shown a preferred embodiment of a roof mount adapter 200 suitable for use to anchor and otherwise secure equipment and hardware devices to a roof 100 of a building or other edifice or structure (not shown). The roof mount adapter 200 of the present invention is suitable for installation on many different types of roof structures, and is particularly suitable for commercial flat membrane type roofs. Examples of well-known flat or low-sloped membrane roofs include an insulated, multi-ply build-up roof; a single or multi-ply modified Bitumen roof; an insulated single ply, mechanically attached roof; and an insulated, single-ply fully adhered roof. Common to these types of flat style roofs is a lowermost support structure formed by, for example, an 18-22 gauge steel deck 114 of the type illustratively shown in FIG. 1, which is covered by one or more layers of insulation/insulation board 116, and a top cover layer 112 formed by cap sheets or a roofing membrane.

Advantageously, the roof mounting adapter of the present invention manages and distributes downward, (i.e., "compression"), upward (i.e., "up-lift"), and lateral (i.e., "shearing") loads, while free-floating above the structural roof deck 114 so as not to damage or otherwise crush the underlying insulation 116 or the roof membrane 112. The load management and distribution is provided by a novel structure which is configured to capture the heads of roofing screws, which are used to fasten the roof mounting adapter to the roof deck, between a bottom ("anchor") plate and a top ("cover") plate which collectively form the roof mounting adapter of the present invention.

For sake of better understanding the invention and use of consistent terms, the roof mount adapter is described herein as attaching to a roof structure of an edifice or building, supporting and securing various types of equipment and hardware structures to the roof of the edifice or building, and being generally circular in shape. However, a person of ordinary skill in the art will appreciate that the roof mount adapter is not limited to being mounted to just roof structures, but can be installed on any flat surface (e.g., flooring, a sidewall, etc.) in which one or more fasteners can be utilized to attach or otherwise mount the roof mount adapter to the flat surface. Furthermore, a person of ordinary skill in the art will appreciate that the roof mount adapter 200 can be configured to interface with various types of brackets 250, hardware devices and/or fasteners for securing the equipment and structures (e.g., air conditioning units, solar panels, cellular antennas, rails, piping, among other structures and frames) to the roof surface. Moreover, a person of ordinary skill in the art will appreciate that the illustrative circular shape of the roof mount adapter is not limiting, and can be configured in other well-known shapes, such as rectangular, oval, triangular, or any other shape including customized shapes for purposes of securing the equipment to the surface of the roof 110.

Moreover, although the roof mount adapter is illustratively described as being substantially planar, a person of ordinary skill in the art will appreciate that the roof mount adapter can alternatively be customized to include angled surfaces or portions to enable mounting of the adapter to corresponding angled portions of the roof surface. For example, the roof mount adapter can be configured as a generally L-shaped adaptor to attach to a corresponding portion of a roof where substantially vertical and horizontal roof structures intersect to form a right angle or corner section of the roof. Accordingly, the roof mount adapter can be configured to correspond to and mount at or proximate the vertex or vertices where two or more planes formed by roof surfaces intersections.

Figure 2:
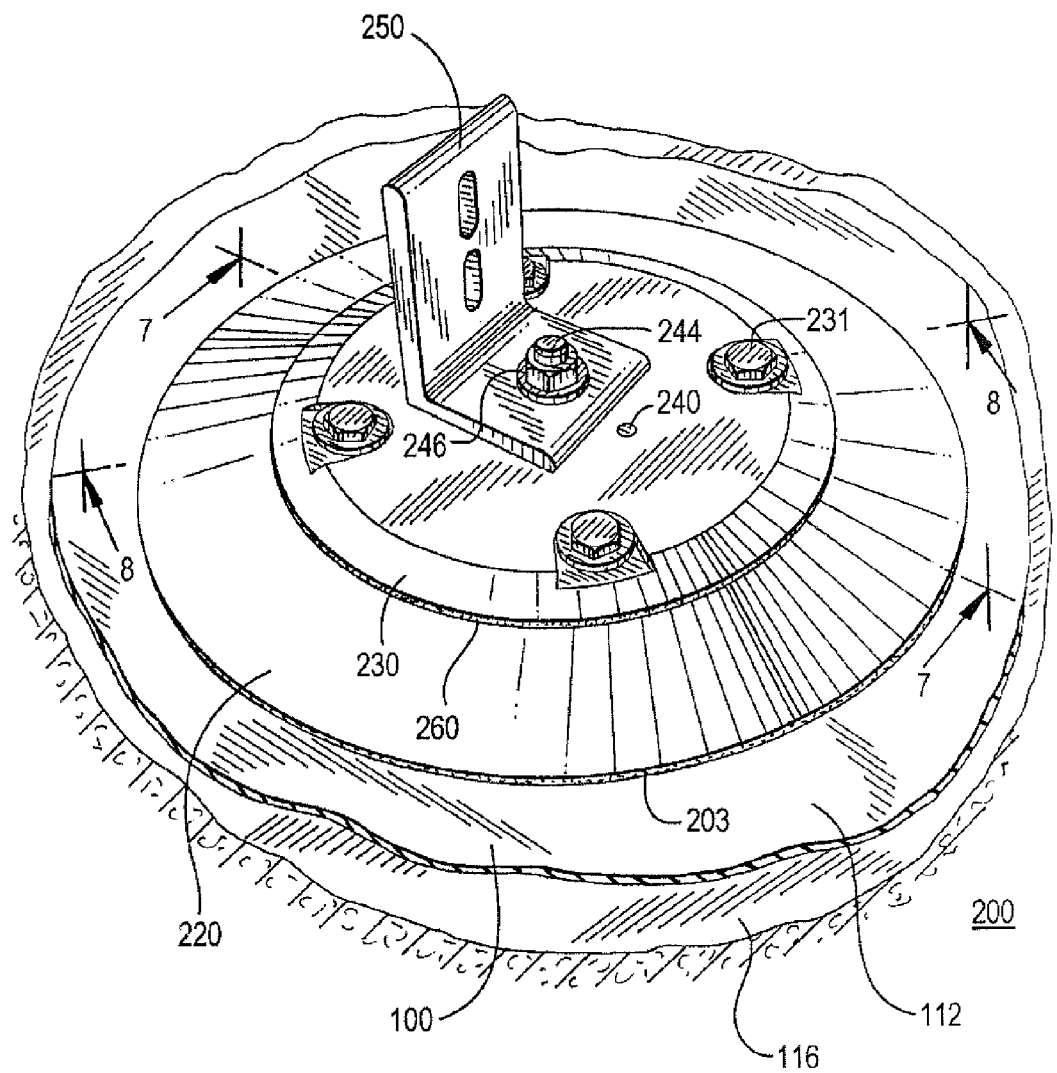
FIG. 2 is a top perspective view of a roof mount adapter of the present invention installed on a roof of a structure.
Figure 3:
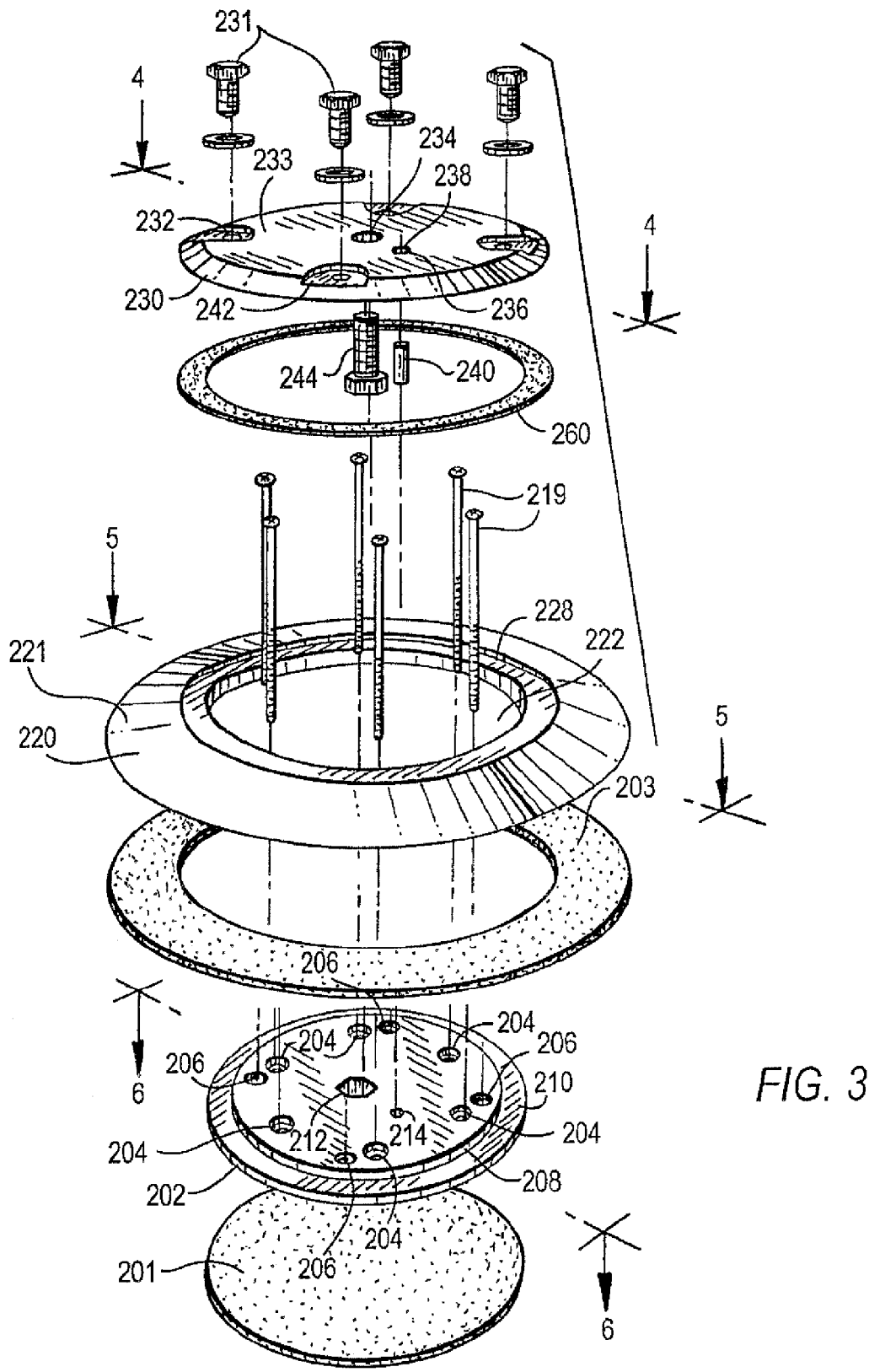
FIG. 3 is an exploded perspective view of the roof mount adapter of FIG. 2 illustrating an anchor plate, a ring cover and a cover plate of the present invention.

Referring now to FIGS. 2 and 3, the roof mount adapter 200 includes an anchor plate 202, a cover ring 220 and a cover plate 230. The anchor plate 202 is generally planar having a substantially flat lower surface that is suitable for mounting over and interfacing with the roof covering 112 of a roof structure 110. The cover ring 220 is mounted over the periphery of the anchor plate 202, preferably with an adhesive material 203, and the cover plate 230 is mounted over the cover ring 220 and the anchor plate 202, as illustratively shown in FIGS. 2 and 3. In one embodiment and as discussed in further detail below with respect to FIGS. 10-12, the fasteners 219 (e.g., self-tapping roof screws) secure the anchor plate 202 to the roof structure 100 to provide additional support at the lower surface of the cover plate 230. Moreover, the heads 217 of the fasteners 219 are captured and locked between the upper surface of the anchor plate 202 and the lower surface of the cover plate 230 to transfer downward forces, upward forces and lateral forces from the equipment to the roof deck 114 without crushing or otherwise compromising the roof insulation 116 and roof membrane 114.

The anchor plate 202 and cover plate 230 are preferably fabricated from machined, high-strength aluminum or stainless steel, although other durable and weather resistant materials and/or composites can be utilized. The cover ring 220 is preferably fabricated from a construction grade polymer such as high density polyethylene (HDPE) among other "plastic" materials, although other durable materials and/or composites (e.g., aluminum, stainless steel, ceramics and the like) can be utilized.

Referring again to FIG. 3, the anchor plate 202 includes a plurality of first apertures 204 for receiving the roof deck fasteners 219 and a plurality of second apertures 206 for securing the cover plate 230 thereto. In particular, the cover plate 230 includes a plurality of third apertures 232 which are positioned and aligned with the plurality of second apertures 206 of the anchor plate 202 so that a corresponding fastener 231 can extend through the second and third apertures to secure the cover plate 230 to the anchor plate 202. The cover plate 230 also includes one or more fourth apertures 234 for securing an external object to the roof mounting adapter 200. Optionally, the anchor plate 202 can further include one or more fifth apertures 212, which correspond to and are positioned and aligned with the one or more fourth apertures 234 of the cover plate 230.

The anchor plate 202 includes a raised shoulder portion 208 extending upwardly from a peripheral flange portion 210. In one embodiment, the shoulder portion 208 has a thickness of approximately ⅓ inch and a diameter of approximately 5¼ inches, and the flange 210 has a thickness of approximately ⅛$^{th}$ inch and a peripheral diameter of 6¼ inches. The dimensions of the anchor plate 202 are for illustrative purposes and are not considered limiting. The flange 210 extends outwardly along the lower portion of the anchor plate 202 and serves as a peripheral rim or edge of the anchor plate 202 for receiving a portion of the cover ring 220, as described below in further detail.

The shoulder portion 208 includes the plurality of first apertures 204 (e.g., unthreaded apertures) for receiving the roof deck fasteners 219, such as self drilling No, 14 or No. 15 standard roof screws. The shoulder portion 208 further includes the plurality of second apertures (e.g., threaded apertures) 206 for receiving a fastener (e.g., threaded bolt) for securing the cover plate 230 to the anchor plate 202.

Figure 6:
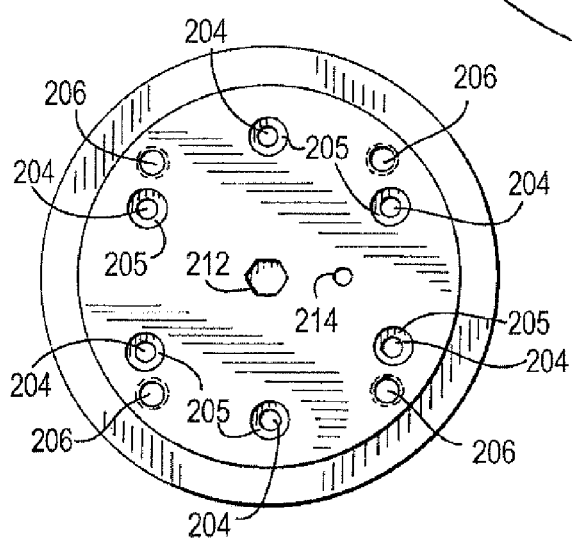
FIG. 6 is a top plan view of the anchor plate depicted in FIG. 3.

Referring now to FIG. 6, in the illustrative embodiment shown, six first unthreaded apertures 204 and four second threaded apertures 206 extend through the upper and lower surfaces of the anchor plate 202. Alternatively, the second threaded apertures 206 can be formed as threaded counter-bores which extend partially through the upper surface of the anchor plate 202. The plurality of first apertures 204 are spaced equidistantly apart from each other. Likewise, the plurality of second apertures 206 are spaced equidistantly apart from each other. Preferably, the first and second apertures 204, 206 are formed in normal direction with respect to the upper surface of the anchor plate 202, although such perpendicular direction is not considered limiting. For example, one or more of the first and second apertures 204, 206 can be formed at angles (e.g., offset 30 degrees from normal) through the anchor plate 202. A person of ordinary skill in the art will appreciate that the illustrative quantity, positioning, spacing and angling of the first and second apertures 204, 206 shown in the drawings is not considered limiting. Preferably, each of the first apertures 204 has a diameter sized to receive the elongated shaft of a roofing screw 219.

Figure 7:
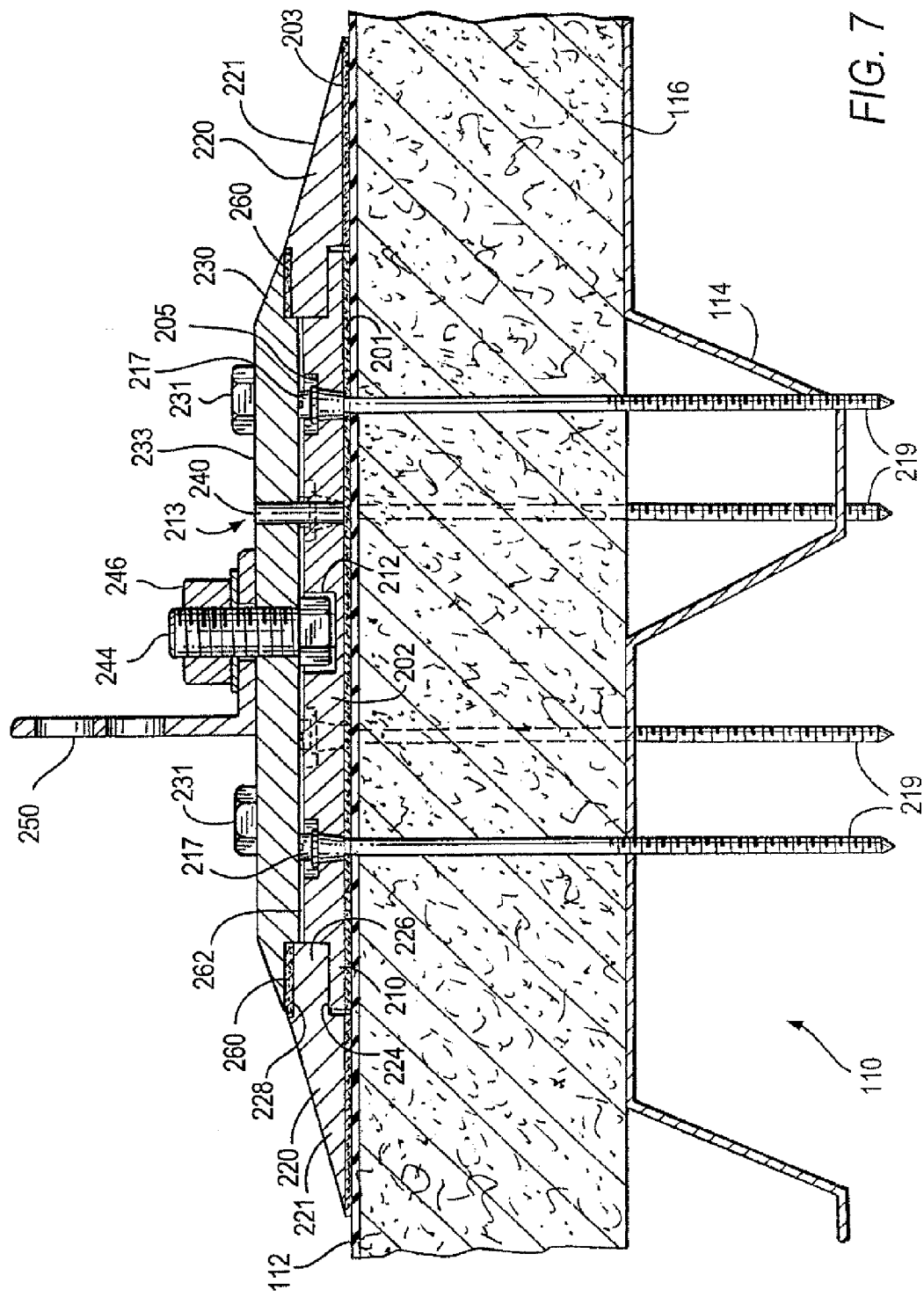
FIG. 7 is a cross-sectional view of the roof mount adapter taken along lines 7-7 of FIG. 2, and illustrating the anchor plate of the roof mount adapter installed to a roof structure.

Referring to FIG. 7, the upper surface of the shoulder portion 208 preferably includes a counter-bore 205 formed about each first aperture 204 to receive and retain a portion of the head of the roof screw 219 therein. The counter-bore 205 has a depth that is sized and dimensioned to allow the roof screw 219 to protrude slightly above the upper surface of the shoulder portion 208 when the screw 219 is inserted. In this manner and as described in further detail with respect to FIGS. 10-12, when the cover plate 220 is secured to the anchor plate 202, a slight gap 262 is formed between the upper surface of the shoulder portion 208 and the lower surface of the cover plate 220. The gap 262 is preferably in a range of 0.031 inches to 0.051 inches, although the distance (e.g., height) of the gap is not considered limiting. The loads (e.g., downward loads) from the equipment are transferred directly to the support decking 114 positioned below the roof surface 112 via the heads 217 and corresponding shanks of the roof screws 219. In this manner, the transfer of the load forces from the equipment to the underlying roof membrane 112 and insulation 116 are avoided. Rather, the loads from the equipment are directed through the elongated roofing screws 219 and transferred directly to the underlying roof decking 114.

Referring now to FIGS. 3 and 6, the shoulder portion 208 of the anchor plate 202 includes the one or more fifth aperture(s) 212 for receiving a third (equipment mounting) fastener (e.g., bolt) 244, which can illustratively be used for securing a bracket 250 or other fastening device to retain the roof equipment. The one or more fifth apertures 212 are positioned and aligned with the corresponding one or more fourth apertures 234 formed in the cover plate 230. In one embodiment, a central fifth aperture 212 (hereinafter "central fifth aperture 212") is a single aperture formed at a central location of the anchor plate 202, and a single fourth aperture 234 (hereinafter "central fourth aperture 234") is formed at a corresponding central location of the cover plate 230. A person of ordinary skill in the art will appreciate that the number, positioning and spacing of the fifth aperture(s) 212 is not considered limiting. As illustratively shown in FIGS. 7 and 8, the at least one fifth aperture 212 can extend partially through the upper surface of the shoulder portion 208 of the anchor plate 202 to serve as a depth-constrained counter-bore for retaining the head of the bolt 244.

For example, the fifth aperture 212 can be circular in shape (not shown) so that the bottom surface of the depth-constrained counter-bore prevents the bolt 244 from turning due to the frictional forces formed between the bottom surface of the bolt head and the adjacent bottom interfacing surface of the counter-bore. In an alternative embodiment, the fifth aperture 212 can be a depth-constrained counter-bore that is configured to correspond in size and shape to the bolt head, e.g., a hex-shaped bolt head, as illustratively shown in FIGS. 3 and 6. In this manner, both the sidewalls and the bottom surface of the fifth aperture 212 retain the bolt head to prevent the bolt 244 from turning. In yet another embodiment, the fifth aperture 212 can extend completely through the anchor plate 202. In this latter embodiment, it is preferable that the fifth aperture 212 be configured (i.e., sized and shaped) to correspond to the configuration of the bolt head, e.g., a hex-shaped bolt head, as illustratively shown in FIG. 3. In this manner, the sidewall surfaces of the fifth aperture 212 interface with and retain the bolt head to prevent the bolt 244 from turning.

Referring again to FIG. 7, the anchor plate 202 is illustratively shown mounted over a flat surface of a roof 110. The anchor plate 202 is secured to the roof decking 114 via the fasteners 219 (e.g., self drilling/tapping roof screws), each of which extends through the roof membrane 112, the insulation, and the roof decking 114 therebelow.

Referring back to FIGS. 3 and 5, the cover ring 220 includes a central opening 222 that is configured in size and shape to receive and circumscribe the periphery of the shoulder portion 208 of the anchor plate 202. The cover ring 220 also includes an inwardly extending flange 226, which is sized to reside or mount over the flange 210 of the anchor plate 202. Preferably, the exterior surface 221 of the cover ring 220 is sloped downwards towards the surface 112 of the roof to direct liquids (e.g., rain water) away from the roof mount adapter 200, as illustratively shown in FIGS. 7 and 8.

Figure 4:
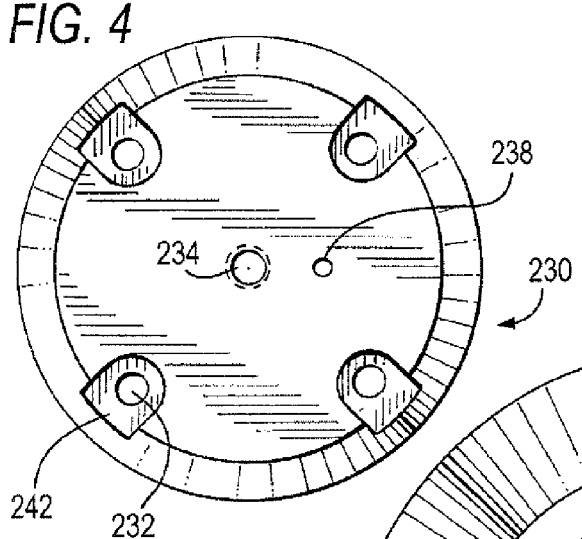
FIG. 4 is a top plan view of the cover plate depicted in FIG. 3.
Figure 5:
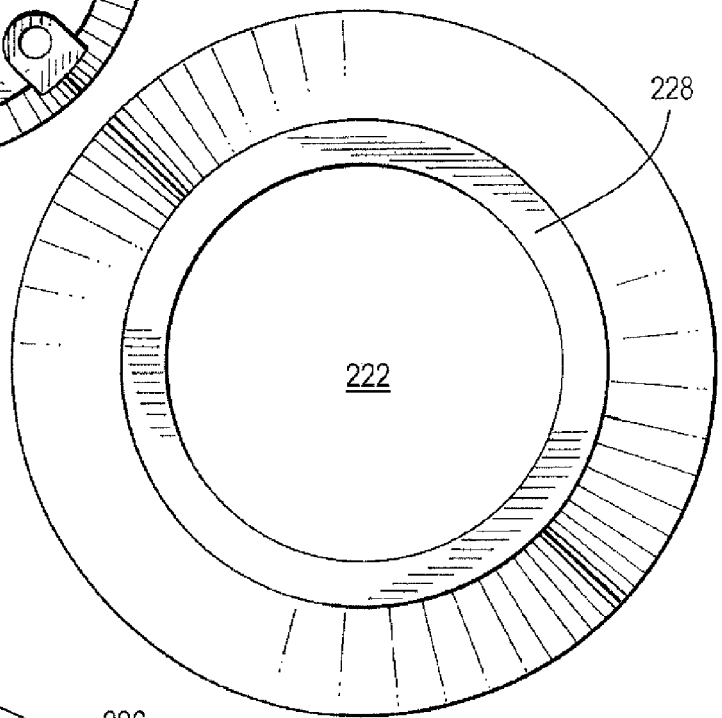
FIG. 5 is a top plan view of the ring cover depicted in FIG. 3.

Referring now to FIGS. 3, 4 and 7, the cover plate 230 is mounted directly over the shoulder portion 208 of the anchor plate 202 and the inwardly extending flange 226 of the cover ring 220. The cover plate 230 has generally planar upper and lower surfaces and a diameter or outer circumference substantially equal to the diameter or outer circumference of the anchor plate 202. Optionally and as illustratively shown in the drawings, the upper surface of the inwardly extending flange 226 of the cover ring 220 includes a gasket seat 228 which can be in the form of a groove, channel, or recess and the like. The gasket seat 228 is configured for receiving a ring gasket 260. The ring gasket 260 is positioned between the lower surface of the cover plate 230 and the upper surface of the inwardly extending flange 226. The ring gasket 260 can be a preformed, expanding urethane foam gasket, or formed by a bead of acrylic and/or silicone caulking, among other well-known exterior, water-resistant types of gaskets fabricated from materials that are durable and suitable for extended exposure in outdoor environments (e.g., hot and/or cold temperatures, radiation from the sun, and the like). The ring gasket 260 can have a compressed thickness in the range of 0.031 to 0.051 inches and is preferably 0.031 inches.

A plurality of third apertures 232 extend through the upper and lower surfaces of the cover plate 230 and are spaced apart and positioned in alignment with the second apertures 206 of the anchor plate 202. Each third aperture 232 is preferably unthreaded and has a diameter sized to receive the threaded shank of a bolt 231. The threaded bolt 231 (e.g., 5/16 inch bolt) extends through the third aperture 232 and is threaded into a corresponding aligned second aperture 206 of the anchor plate 202.

Preferably, a counter-bore or groove 242 is formed in the upper surface 233 of the cover plate 230 in at least an area partially circumscribing each third aperture 232. The counter-bore or groove 242 provides a recess for the head of the corresponding bolt 231 to minimize interference by the head of the bolt 231 with the bracket/fastener 250 or support member of the chassis used for mounting the equipment being installed. The bolts 231 secure the cover plate 230 to the anchor plate 202 as illustratively shown in FIG. 7. As noted, preferably, the exterior periphery of the cover plate 230 is inclined downwardly so that fluids can run off from the upper surface 233 of the cover plate 230, down the sloped surface of the cover ring 220, and away from the roof mount adapter 200. Further, the upper exterior surface 233 of the cover plate 230 is illustratively shown as being substantially planar in FIGS. 7 and 8. However, the upper surface 233 can be domed, i.e., convex in shape to also help direct liquids away from the roof mount adapter 200.

As noted above, the cover plate 230 includes at least one fourth aperture 234 (i.e., the "central fourth aperture 234") for receiving an equipment mounting fastener (e.g., bolt) 244 to secure a bracket 250 or other fastening device for retaining the roof equipment. The central fourth aperture 234 is illustratively a single aperture formed at a central location of the cover plate 220. The central fourth aperture 234 is configured (i.e., sized and shaped) to receive the equipment mounting fastener (e.g., ⅜ inch bolt) 244. Accordingly, one or more pairs of fourth and fifth apertures 224 and 212 can be provided to secure an object, e.g., equipment or hardware device, to the roof mount adapter 200 of the present invention. Preferably, the at least one central fourth aperture 234 is threaded so that the corresponding bolt 244 can be fully threaded therein.

As described above, the fifth aperture 212 is preferably provided to receive the head of the bolt 244 and prevent the upright extending bolt 244 from turning. Alternatively, the fifth aperture 212 can be optional (e.g., not formed in the anchor plate 202 or not used if present), and the bolt 244 can be secured directly to the upper surface 233 of the cover plate 230. In this alternative embodiment, the bolt 244 extends downwardly in the opposite direction of the previous embodiment and is threadedly engaged directly with the fourth aperture 234 to secure an object to the roof mount adapter 200. In this latter embodiment, the bolt 244 is secured only to the cover plate 230, and if the fifth aperture 212 is present, it can provide additional space for the shank of the bolt 244 to extend downwardly therein.

Referring again to FIGS. 3 and 7, a keying mechanism or arrangement 213 can be provided to align the cover plate 230 with the anchor plate 202. In one embodiment, the keying arrangement 213 includes a first bore 214 formed in the anchor plate 202 and a second bore 236 provided in the cover plate 230. The first and second bores 214 and 236 preferably have the same diameter and are sized to receive a pin 240 therethrough. The bores 214 and/or 236 and pin 240 collectively serve as female and male keying members for aligning the anchor plate 202 and the cover plate 230 so that the second apertures 206 and the third apertures 232 are properly aligned during installation. Although the pin 240 is illustratively shown as an independent component, a person of ordinary skill in the art will appreciate that the pin 240 can be integral and extend vertically upward from the shoulder portion 208 of the anchor plate 202 or extend vertically downward from the lower surface of the cover plate 230. For example, the pin 240 can be press-fit into the first bore 214 of the anchor plate or the second bore 236 of the cover plate 220 during the manufacturing process of the roof mount adapter 200.

Figure 8:
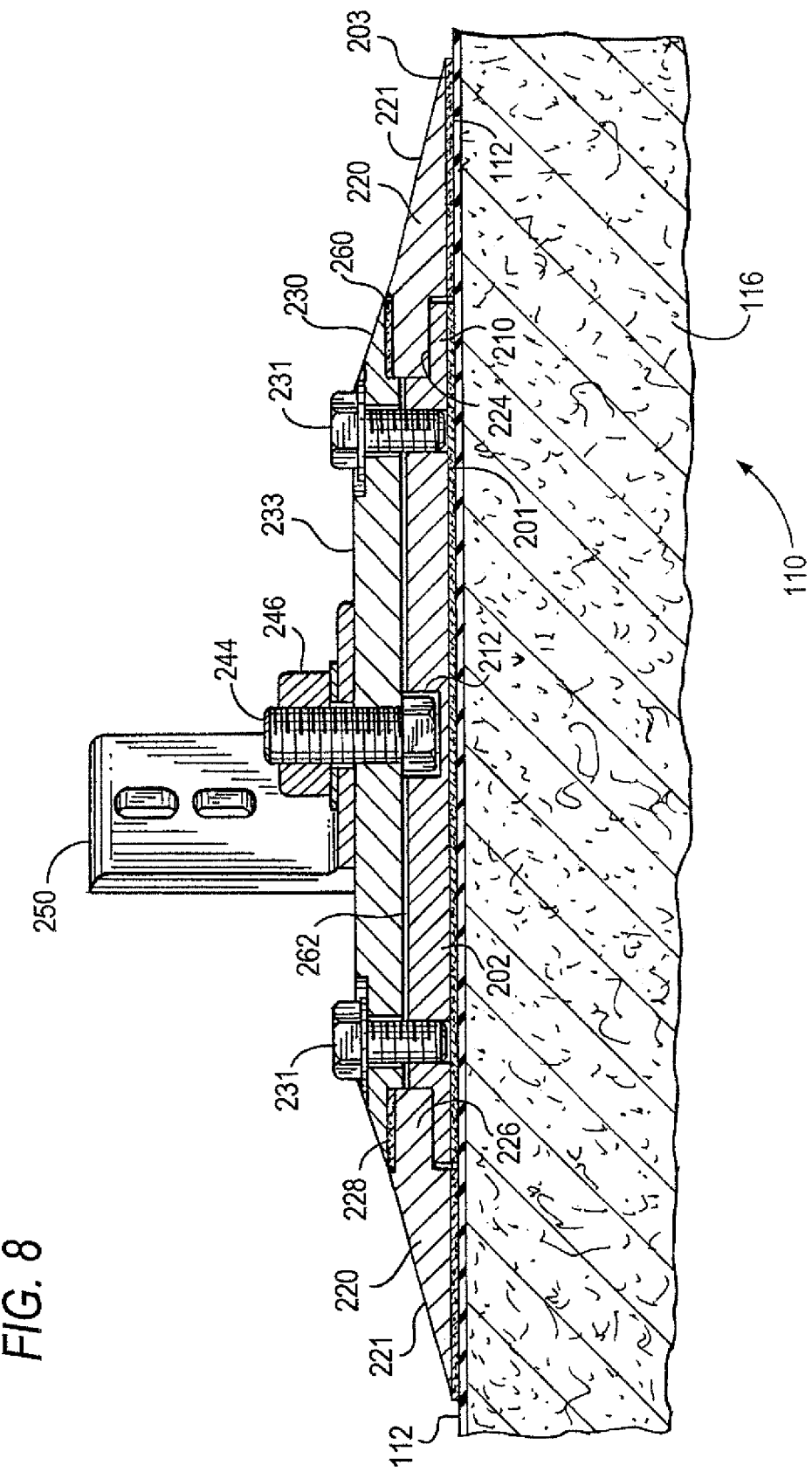
FIG. 8 is a cross-sectional view of the roof mount adapter taken along lines 8-8 of FIG. 2, and illustrating the cover plate of the roof mount adapter mounted to the anchor plate.

Referring now to FIGS. 7 and 8, a bracket 250 associated with the equipment or hardware being mounted is fastened to the roof mount adapter 200 by the third (equipment mounting) fastener, i.e., bolt 244, washer and nut 246. The bracket 250 is shown for illustrative purposes and does not form a part of the roof mount adapter 200 of the present invention.

As also shown in FIGS. 7 and 8, upon completing the installation of the roof mounting adapter 200 of the surface of the roof 110, the lower surface of the cover plate 230 is spaced apart from the upper surface (i.e., shoulder portion 208) of the anchor plate 202. The spacing between the upper surface of the anchor plate 202 and lower surface of the cover plate 230 is defined by the height of the heads of the roof screws 219. The roof screws 219 are commercially available roofing fasteners, e.g., heavy duty or extra heavy duty roofing screws such as, for example, model HD (No. 14) or XHD (No. 15) roof screws manufactured by OMG Roofing Products, located in Agawam, Mass. 01001, USA. The roof screws 219 can have a head portion with a height in a range of 0.010 to 0.0151 inches, and are preferably 0.0131 inches in height. In most instances, variations in the roofing screws 219 as between the different fastener manufactures is deemed inconsequential, as long as the screw head height is the same (i.e., uniform) in each of the corresponding first apertures 204 to secure the anchor plate 202 to the roof decking 114.

Figure 9A:
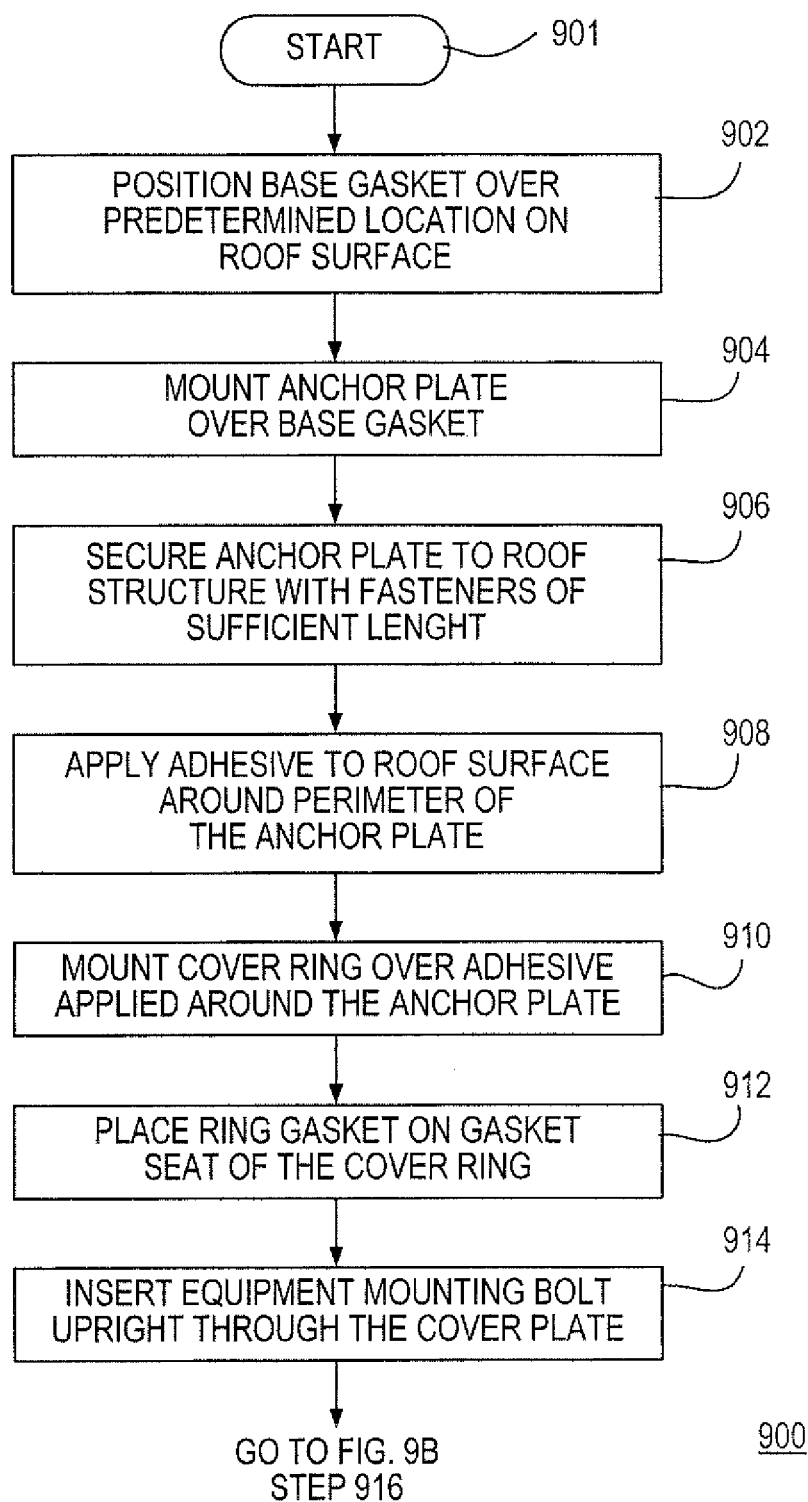
FIGS. 9A and 9B collectively depict a flow diagram of a method for installing the roof mount adapter of FIG. 3 on a roof structure.
Figure 9B:
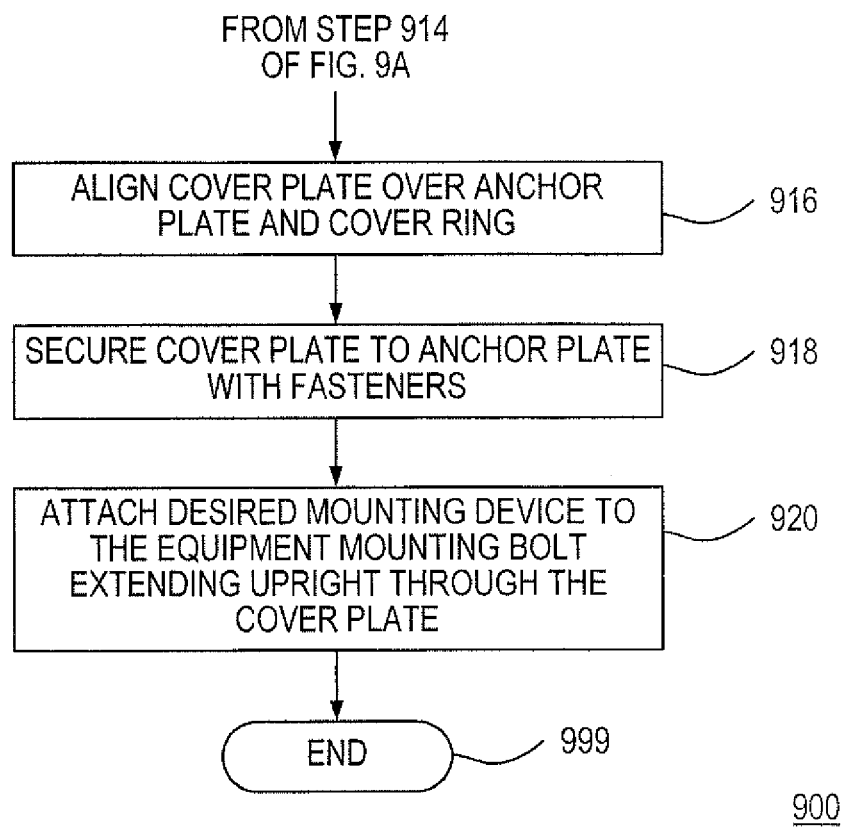

Referring now to FIGS. 9A and 9B, a flow diagram of a method 900 for installing the roof mount adapter 200 of FIGS. 2-8 on a roof structure 110 is illustratively shown. Referring to FIG. 9A, the method 900 begins at step 901, where a local site on a flat surface of a roof is selected for installing the equipment and/or hardware on the roof 110. As described above, the equipment and/or hardware can be an air conditioning unit, solar panels, a heat exchanger, protective railing, and the like. Moreover, the present method is not limited to being practiced on roof surfaces, but can be performed on any substantially flat surface, including a floor, wall, and/or ceiling of a structure.

At step 902 and also referring to FIG. 3, a base gasket 201 is positioned over the predetermined location on the roof surface. Specifically, the exterior surface 112 of the roof 110 is initially cleared at the immediate area beneath and around the site where the base gasket 201 is placed. This area can be "broom cleaned" by clearing any roof gravel, bird droppings and/or other undesirable debris that may be present. The base gasket 201 is positioned on the cleared roofing surface.

The base gasket 201 is shaped and dimensioned to conform to the shape and dimensions of the lower surface of the anchor plate 202. The base gasket 201 can be a commercially available preformed expanding urethane foam gasket, a layer of acrylic and/or silicone caulking, or other well-known gaskets or sealants that are suitable for outdoor use in environments which are subject to hot and cold temperature changes. The method 900 then proceeds to step 904.

At step 904, the bottom ("anchor") plate 202 is positioned and mounted over the base gasket 201. In particular, at step 906, the anchor plate 202 is secured to the roof decking 114 by a plurality of self-drilling roof screws 219. The self-drilling roof screws 219 are commercially available and do not form a part of the present invention. An example of a commercially available self-drilling roof screw is a No. 14 or No. 15 standard roof screw having a length of 6 inches. A person of ordinary skill in the art will appreciate that the size of the screw is determined by the thickness of the roof, i.e., the combination of the roof membrane 112, the insulation 116 and the roof decking 114. The head of the roof screw 219 can be, for example, a hex-shaped or Philips head screw which can easily be driven directly through the roof membrane 112, the insulation layer(s) 116 and into the roof decking 114 by using a power tool such as an electric power drill, screw gun or pneumatic tool. As such, the screws 219 are driven through the exterior surface of the roof 110 to secure the anchor plate 202 to the roof decking 114 without tearing the roof membrane 112 or crushing the insulation 116 therebelow.

At step 908 and also referring back to FIG. 3, an adhesive 203 is applied around the circumference of the anchor plate 202. The adhesive 203 is used to secure the cover ring 220 over the anchor plate 202. The adhesive 203 can be any commercially available low-rise urethane roof adhesive, such as model ANDEK 950 Expandable Urethane Adhesive, manufactured by ANDEK Corporation of Moorestown, N.J. 08057, USA. A person of ordinary skill in the art will appreciate that other types of commercially available adhesives can be utilized which are suitable for outdoor roofing applications, including acrylic, silicone and the like, which are resistant to hot and cold temperature changes and/or sunlight radiation. At step 910, the cover ring 220 is mounted over the adhesive circumscribing the perimeter of the anchor plate 202. The inwardly extending flange 226 of the cover ring 220 overlaps the anchor plate flange 210, as illustratively shown in FIGS. 7 and 8. The method 900 then proceeds to step 912, where the ring gasket 260 is placed on the gasket seat 228 of the cover ring 220.

At step 914, the equipment mounting fastener, e.g., the bolt 244 is inserted through the central fourth aperture 234 formed in the cover plate 230. For example, the bolt 244 is fully threaded into the central fourth aperture 234. Alternatively, the head of the bolt 244 is inserted into the central fifth aperture 212 formed in the anchor plate 202. In this alternative embodiment, the central fifth aperture 212 can be hex-shaped to correspond to the bolt head, and the central fourth aperture 234 can be an unthreaded bore. By either technique, the shaft of the bolt 244 extends upright (e.g., perpendicular) from the upper surface 233 of the cover plate 230 or anchor plate 202, respectively, as illustratively shown in FIGS. 7 and 8. Recall that the equipment mounting fastener (e.g., bolt) 244 is provided to secure a mounting bracket or the frame/chassis of the equipment to the upper surface 233 of the cover plate 230. A person of ordinary skill in the art will appreciate that a plurality of bolts 244 or other equipment mounting fasteners and corresponding apertures can be provided in the anchor plate 202 and cover plate 230 to secure a bracket 250 or the frame/chassis of the equipment to the upper surface 233 of the cover plate 230. The method 900 then proceeds to step 916.

Referring to FIG. 9B, at step 916, the cover plate is aligned over the anchor plate 202 and cover ring 220. In particular, the third apertures 232 formed in the cover plate 230 are positioned and aligned with the second threaded apertures 206 formed in the anchor plate 202. The alignment of the two plates can be performed by hand, and is preferably done by using the keying arrangement 213, which includes aligning the pin 240 with the corresponding first bore 214 or second bore 236. For example, if the pin 240 is press-fitted into the first bore 214 and extends upwards, the second bore 236 is aligned with the upper portion of the pin 240 as the cover plate 230 is lowered onto the cover ring gasket 260 of the cover ring 220.

The alignment step also requires the bolt 244 to be properly seated in the central fifth aperture 212 of the anchor plate 202. Preferably, the bolt 244 is first threaded through the central fourth aperture 234. As described above, in one embodiment the central fifth aperture 212 is shaped and sized to conform to the shape of the head of the bolt 244 to keep the bolt 244 in an upright position and prevent the bolt shaft from inadvertently turning. The bolt 244 is loosely threaded all the way into the central fourth aperture 234 and as the cover plate 230 is lowered onto the cover ring gasket 260, the bolt 244 can be rotated by hand to coincide and properly seat within the hex-shaped central fourth aperture 234 to prevent further turning thereof. In an alternative embodiment, the central fifth aperture 212 is a depth constrained counter-bore 212 having a circular shape. In this alternative embodiment, the bolt 244 is threaded (e.g., all the way) into the central fourth aperture 234 and as the cover plate 230 is lowered onto the cover ring gasket 260, the head of the bolt 244 is seated within the depth-constrained counter-bore 212 as the cover plate 230 is lowered thereon. The surface of the bolt head contacts the adjacent (e.g., upper) surface of the depth-constrained counter-bore 212 (and the lower surface of the cover plate 230) and the frictional forces therebetween help prevent further turning of the bolt 244 when a fastener, e.g., nut 246 is tightened thereon. The method 900 then proceeds to step 918.

At step 918, the cover plate 230 is secured to the anchor plate 202 with the second fasteners, i.e., bolts 231. Specifically, the bolts 231 pass through the third apertures 232 and are threaded into the corresponding second apertures 206 provided in the anchor plate 202. Preferably, flat and/or gasket washers are provided adjacent each bolt head 231 to provide a smooth waterproof surface for the bolt 231 to bear on and to distribute the pressure of the bolt 231 evenly over the area being secured to minimize damage thereto.

At step 920, the desired equipment mounting bracket 250 (or support leg or mount of the equipment chassis) is attached to the third fastener (i.e., bolt) 244. As illustratively shown in FIG. 2, a bracket 250 is secured to the bolt 244 with a washer and nut 24. The method 900 then proceeds to step 999, where the method 900 ends. If additional roof mount adapters 200 are required to support the equipment (e.g., solar panels, air conditioning units, and the like), the method 900 is repeated at each predetermined location where the roof mount adapter 200 is to be installed. Once all of the required roof mount adapters 200 have been properly attached to the surface of the roof 110 at their designated locations, the equipment can be securely installed thereon.

A person of ordinary skill in the art will appreciate that the sequence of the steps of method 900 are not considered limiting. Illustratively, step 914 can be eliminated or modified since a roofer/equipment technician can alternatively insert the third fastener, e.g., bolt 244 in a reverse (downwardly) direction through the upper surface 233 of the cover plate 230. In this instance, the head of the bolt 244 will not extend upright and/or be seated in the fifth aperture 212 of the anchor plate 202. Rather, the head of the bolt 244 will extend downwardly and reside along the upper surface 233 of the cover plate 230. That is, step 920 can be modified such that the third fastener 244 is used to attach the bracket 250 or hardware to the upper surface 233 of the cover plate 230. Accordingly, attachment of the third fastener 244 would occur after the cover plate 230 has been secured to the anchor plate 202.

Figure 10:
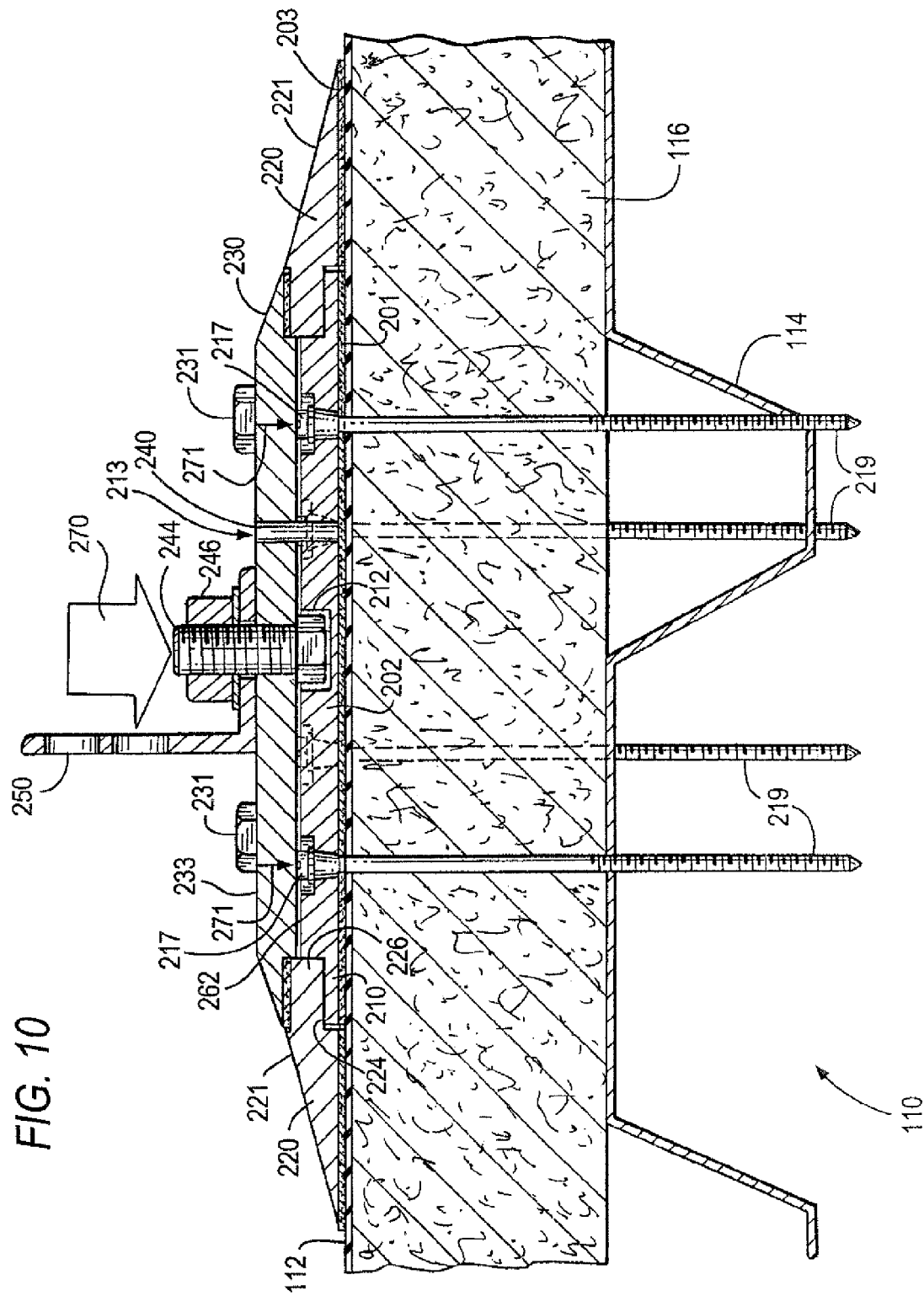
FIG. 10 is a cross-sectional view of the roof mount adapter installed on the roof structure and illustrating a downward force vector being applied to the roof mount adapter by the equipment secured thereto.
Figure 11:
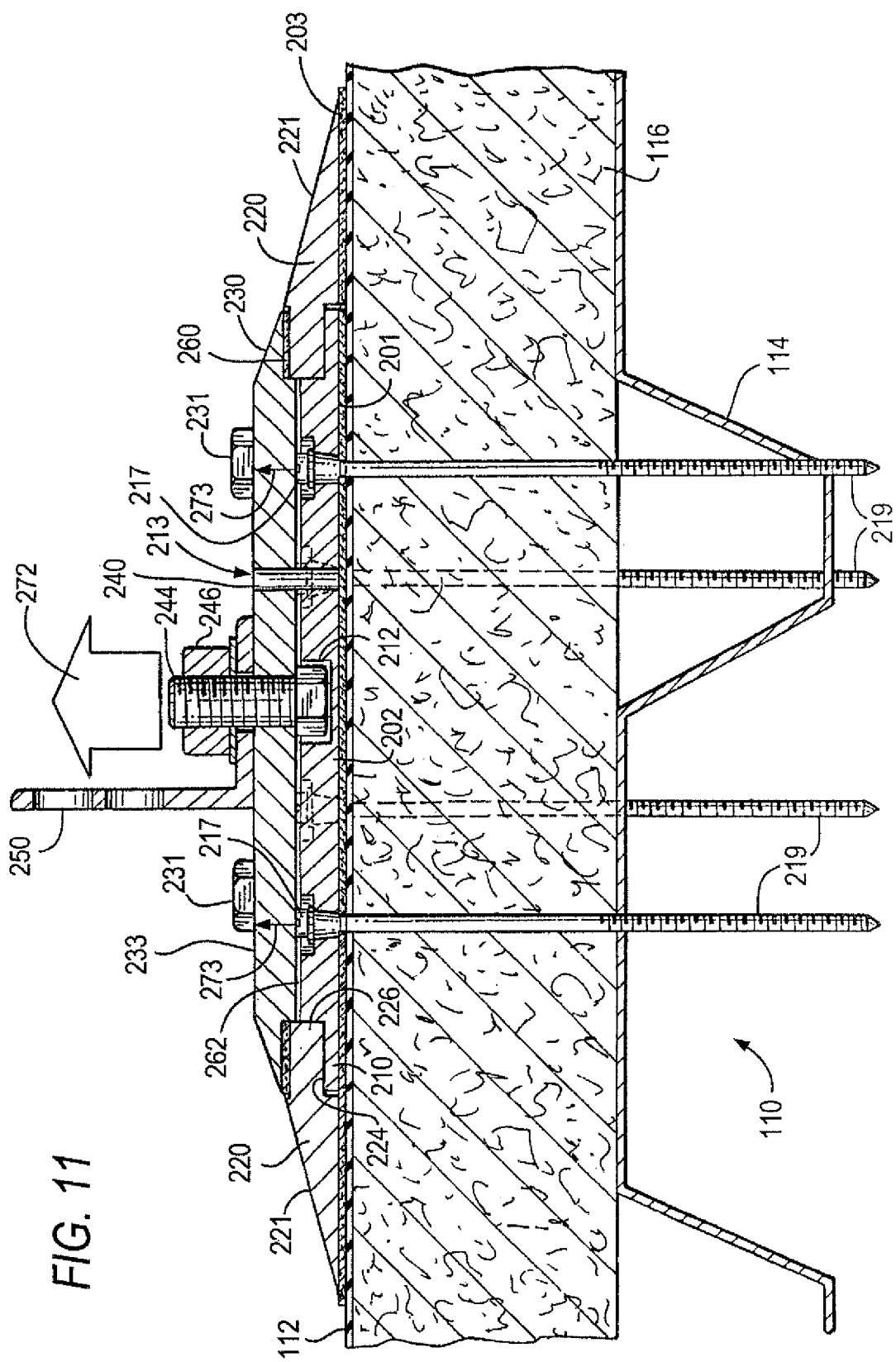
FIG. 11 is a cross-sectional view of the present roof mount adapter installed on the roof structure and illustrating an upward force vector being applied to the roof mount adapter by the equipment secured thereto.
Figure 12:
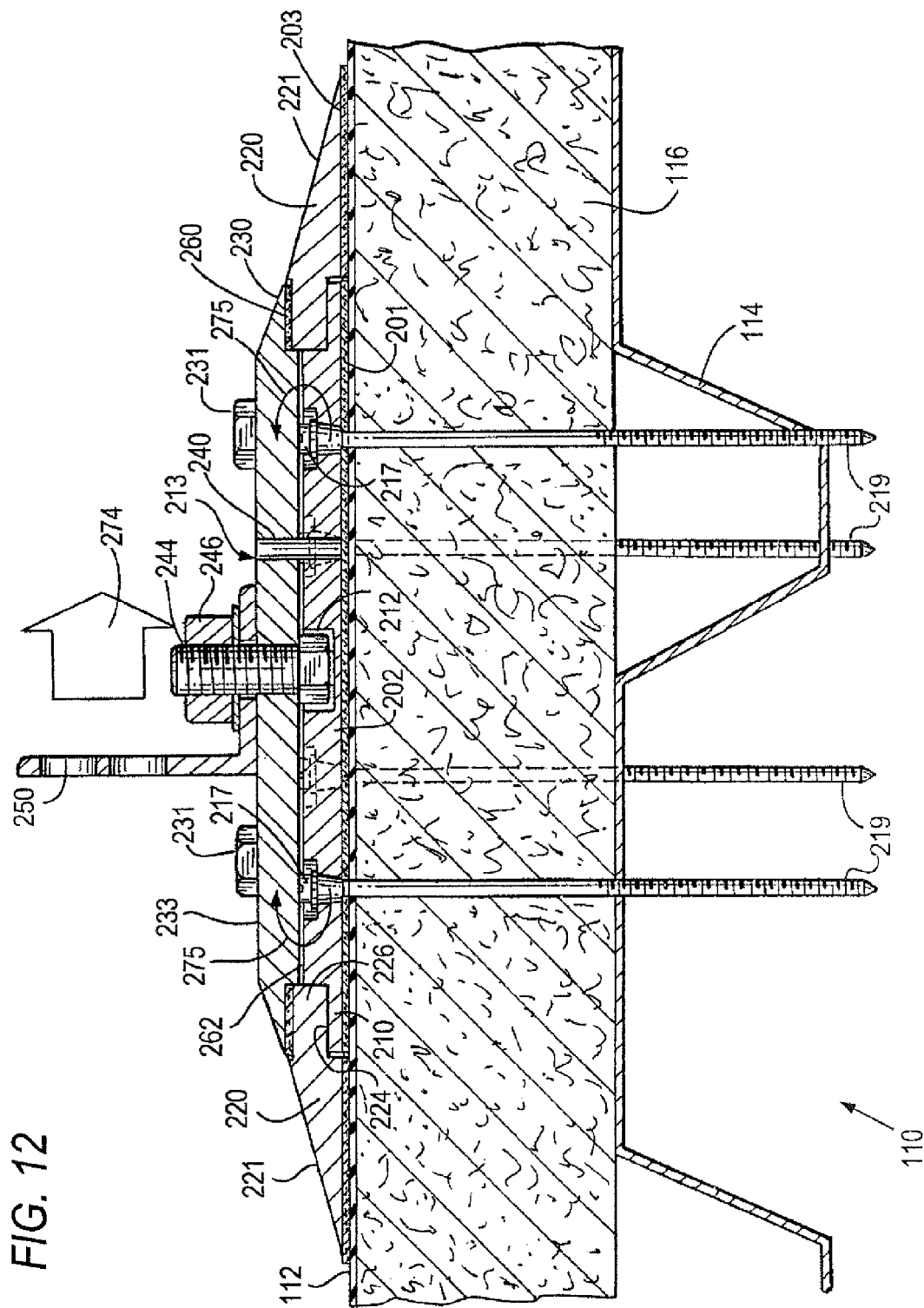
FIG. 12 is a cross-sectional view of the present roof mount adapter installed on the roof structure and illustrating a lateral force vector being applied to the roof mount adapter by the equipment secured thereto.

Referring now to FIGS. 10-12, depicted are cross-sectional views of the roof mount adapter 200 installed on the roof structure 110 and illustrating a downward ("compressive"), upward ("uplift") and lateral ("shearing") forces respectively being applied to the roof mount adapter by the equipment secured thereto. Referring now to FIG. 10, a downward compressive force vector is illustratively shown by arrow 270.

The downward force vector 270 has a magnitude that corresponds at least in part to the distributed total weight of the equipment exerted on the roof mount adapter 200. A person of ordinary skill in the art will appreciate that other forces from wind, snow, ice, tension wires and the like can further contribute to the magnitude (and direction) of the downward force vector 270. The magnitude or load on each roof mount adapter is dependent on the quantity and positioning of the roof mount adapters 200 used to support the equipment on the roof, as well as the weight of the equipment distributed over the roof mount adapter 200.

For example, consider a chassis including four support legs for supporting a symmetrically shaped solar panel having a total weight of 160 Kilograms (Kg) which is evenly distributed over the structure. When the chassis and solar panel are installed and supported by four roof mount adapters 200 of the present invention, the total weight of the equipment is evenly distributed among the four installed roof mount adapters 200, i.e., each roof mount adapter will have a downward force vector 270 with a magnitude of 40 Kg (160 Kg/4).

The downward force 270 is transferred to the roof decking 114 via each elongated screw 219, as shown by arrows 271. That is, each elongated screw 219 distributes the downward force from the equipment 250 to the roof decking 114. Continuing with the example above, if there are six elongated screws 219 used to secure the anchor plate 202 to the roof 110, then each screw 219 will support a proportion of the downward force magnitude associated with the total magnitude experienced by the roof mount adapter. In the present example in which each roof mount adapter has a downward force magnitude of 40 Kg, each screw 291 of the roof mount adapter will support approximately one-sixth of the total downward force vector, i.e., 6.667 Kg (40 Kg/6).

Referring now to FIGS. 11 and 12, in FIG. 11, an upward force vector is illustratively shown by arrow 272. Similarly, in FIG. 12, a lateral force vector is illustratively shown by arrow 274. An upward force 272 and lateral force 274 can be applied to the equipment 250 and the roof mount adapter 200 by upwardly and laterally directed winds, tension wires and other external forces. The upwardly directed force 272 is distributed as an upward force component on each elongated screw 219 as indicated by arrows 273 in FIG. 11. Similarly, the laterally directed force 274 is distributed as a lateral force component on each elongated screw 219 as indicated by arrows 275 in FIG. 12.

Accordingly, each screw 219 will transfer a proportion of the total sum of the downward, upward and lateral forces 270, 272 and 274 to the underlying roof decking 114. The anchor fasteners (i.e., roofing screws) 219 which will be selected for use are in accordance with the screw manufacturer's specifications and ratings to withstand the maximum combined downward, upward and lateral loads that may be experienced on the roof 110. In this manner, the elongated roof screws 219 will maintain the roof mount adapter 200 in its selected position on the roof surface 112 and at a predetermined height above the roof decking 114 to prevent damaging and/or crushing of the insulation 116 therebetween when exposed to the combined (or net) downward, upward and lateral forces.

As described above, the roof mount adapter of the present invention enables a roofer or equipment installation technician to install or otherwise mount equipment on a generally flat roof surface. Moreover, the roofer/technician does not have to cut away the roofing membrane and insulation to expose the underlying roof decking 114 to subsequently mount the equipment mounting adapter as required in the prior art. Advantageously, the roof mount adapter of the present invention eliminates the need to expose the underlying roof decking and further having to patch the damaged roof during the installation process to prevent water leakage.

As will be apparent to one of ordinary skill in the art from the above description, other embodiments can be derived by obvious modifications and variations of the apparatus and methods disclosed. The scope of the invention is therefore to be determined by the claims that follow.

I claim:

1. A mounting adapter for attaching an object to a generally flat surface comprising:
    a generally planar anchor plate having an upper surface and a lower surface, and a plurality of first apertures extending therethrough the upper and lower surfaces, each first aperture being configured to receive a first elongated fastener having a length sufficient to extend therethrough the anchor plate and securely fasten to a support structure positioned beneath the generally flat surface, and a plurality of second apertures extending at least through the upper surface;
    a generally planar cover plate having an upper surface and a lower surface, the lower surface of said cover plate being positioned over the upper surface of said anchor plate and having a plurality of third apertures extending therethrough the upper and lower surfaces of the cover plate, said plurality of third apertures corresponding to and being positioned in alignment with said plurality of second apertures;

a second fastener configured to extend through each said third aperture and securely engage with a corresponding one of the plurality of second apertures of said anchor plate for securely mounting said cover plate over said anchor plate;

wherein said cover plate further includes one or more fourth apertures formed in at least said upper surface of the cover plate, each fourth aperture being configured to receive a corresponding third fastener for securing the object to the mounting adapter; and wherein the lower surface of the cover plate and the upper surface of the anchor plate are configured to facilitate direct transfer of load forces from the object to the support structure positioned beneath the generally flat surface through each first elongated fastener.

2. The mounting adapter of claim 1, further comprising a ring cover having an outer portion circumscribing the anchor plate and an inner portion positioned between the lower surface of the cover plate and the upper surface of the anchor plate.

3. The mounting adapter of claim 1, further comprising a ring gasket positioned between an upper surface of the inner portion of the ring cover and the lower surface of the cover plate.

4. The mounting adapter of claim 1, further comprising a gap formed between the lower surface of the cover plate and the upper surface of the anchor plate.

5. The mounting adapter of claim 4, wherein said gap is formed by a head portion of each first elongated fastener extending upwardly from the upper surface of the anchor plate.

6. The mounting adapter of claim 5, wherein the lower surface of the cover plate provides a resultant force vector on the head and along the longitudinal axis of each first elongated fastener.

7. The mounting adapter of claim 1, wherein each first aperture includes a counter-bore for receiving a head portion of a corresponding one of the plurality of first elongated fasteners.

8. The mounting adapter of claim 1, wherein the second apertures of the anchor plate and the corresponding aligned third apertures of the cover plate are spaced equidistantly apart from each other.

9. The mounting adapter of claim 1, wherein each of the plurality of second apertures is a threaded aperture and each second fastener is a correspondingly dimensioned threaded bolt.

10. The mounting adapter of claim 1, wherein the cover plate and the anchor plate include a keying arrangement for aligning the cover plate over the anchor plate.

11. The mounting adapter of claim 1, wherein the one or more fourth apertures extend through at least a portion of said upper surface of the cover plate, and each fourth aperture is configured to receive a corresponding one of the third fasteners.

12. The mounting adapter of claim 11, wherein the one or more fourth apertures are threaded apertures and each third fastener is a bolt.

13. The mounting adapter of claim 1, wherein the one or more fourth apertures extend through said upper and lower surfaces of the cover plate, and each fourth aperture is configured to receive a corresponding one of the third fasteners extending upwardly from the upper surface of the cover plate.

14. The mounting adapter of claim 1, wherein the anchor plate includes one or more fifth apertures extending through at least a portion of the upper surface of the anchor plate, each fifth aperture being aligned with a corresponding one of the fourth apertures and configured to receive a head portion of the third fastener for attaching the object to the mounting adapter.

15. A mounting adapter for attaching an object to a mounting surface, comprising:

a generally planar anchor plate having opposing planar surfaces and a plurality of first apertures extending therethrough the opposing surfaces, and a plurality of threaded apertures extending therethrough the opposing surfaces of the anchor plate, the plurality of first apertures being configured and dimensioned to receive a first elongated fastener having a length sufficient to extend and securely fasten to a support structure located beneath the mounting surface to attach said anchor plate to the mounting surface;

a generally planar cover plate having opposing planar surfaces and configured to mount over said anchor plate such that load forces from the object are transferred directly to the support structure positioned beneath the mounting surface through each first elongated fastener, the cover plate having a plurality of third apertures which are configured and arranged to align with said plurality of threaded apertures of the anchor plate, and one or more fourth apertures;

a threaded fastener extending through each said plurality of third apertures and threadedly engaged with each said respective threaded aperture of said anchor plate to securely attach said cover plate to said anchor plate such that a gap is formed therebetween the generally planar anchor and cover plates; and one or more third fasteners configured to interface with the one or more fourth apertures of the cover plate for attaching the object to the mounting adapter.

16. A method for attaching an object to a mounting surface with a mounting adapter, the mounting adapter comprising an anchor plate having a plurality of first apertures and a plurality of second apertures; and a cover plate having a plurality of third apertures extending therethrough, each third aperture configured to align with a corresponding second aperture of the anchor plate, and at least one fourth aperture configured to receive a corresponding third fastener, the method comprising the steps of:

positioning the anchor plate on the mounting surface at a predetermined location;

inserting an elongated fastener through a corresponding one of said first apertures;

securing each elongated fastener to a predetermined support structure positioned beneath the mounting surface for attaching said anchor plate to the mounting surface;

mounting the cover plate over the anchor plate such that each of the plurality of third apertures is positioned and axially aligned with each of the corresponding plurality of second apertures of the anchor plate;

inserting a second fastener through a corresponding one of said third apertures;

securing each second fastener to a corresponding second aperture in said anchor plate for firmly attaching said cover plate to said anchor plate; and securing at least one third fastener to a corresponding one of the at least one fourth aperture for attaching the object to the mounting adapter.

securing at least one third fastener to a corresponding one of the at least one fourth aperture for attaching the object to the mounting adapter, wherein a lower surface of the cover plate and an upper surface of the anchor plate are configured to facilitate direct transfer of load forces from the object to the support structure positioned beneath the mounting surface through each elongated fastener.

17. The method of claim 16 further comprising the steps of:
installing a base gasket on the mounting surface at the predetermined location prior to positioning the anchor plate thereon; and
positioning a lower surface of the anchor plate on the base gasket.

18. The method of claim 16 further comprising the step of mounting a ring cover over the anchor plate prior to mounting the cover plate.

19. The method of claim 18 further comprising the step of applying an adhesive to an area of the mounting surface circumscribing the anchor plate prior to mounting the ring cover.

20. The method of claim 19 further comprising the step of mounting a gasket seal over the cover ring prior to mounting the cover plate.

21. The mounting adapter of claim 1, wherein the load forces from the object include a compressive load force.

22. The mounting adapter of claim 1, wherein the load forces from the object include a tensile load force.

23. The mounting adapter of claim 1, wherein the load forces from the object include a shearing load force.

* * * * *